(12) United States Patent
Kim et al.

(10) Patent No.: US 10,118,370 B2
(45) Date of Patent: Nov. 6, 2018

(54) ARTICLE AND MANUFACTURING METHOD OF ARTICLE

(71) Applicant: Lotte Advanced Materials Co., Ltd., Yeosu-si (KR)

(72) Inventors: Young-Sin Kim, Uiwang-si (KR); Kang-Yeol Park, Uiwang-si (KR); Young-Chul Kwon, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 13/872,250

(22) Filed: Apr. 29, 2013

(65) Prior Publication Data

US 2014/0072795 A1     Mar. 13, 2014

(30) Foreign Application Priority Data

Sep. 7, 2012   (KR) .................. 10-2012-0099034

(51) Int. Cl.
*B32B 27/08*        (2006.01)
*B29C 44/02*        (2006.01)
(Continued)

(52) U.S. Cl.
CPC .............. *B32B 27/08* (2013.01); *B05D 3/00* (2013.01); *B29C 44/02* (2013.01); *B29C 69/007* (2013.01); *B32B 5/16* (2013.01); *C08J 9/009* (2013.01); *C08J 9/122* (2013.01); *C09C 1/64* (2013.01); *B29C 44/3442* (2013.01); *B29C 44/3446* (2013.01); *B29C 44/3453* (2013.01); *B29C 45/1703* (2013.01); *C01P 2004/03* (2013.01); *C01P 2006/60* (2013.01); *C08J 2203/06* (2013.01); *C08J 2203/08* (2013.01); *C08J 2333/12* (2013.01); *Y10T 428/249986* (2015.04)

(58) Field of Classification Search
None
See application file for complete search history.

(56) References Cited

U.S. PATENT DOCUMENTS 3,549,405 A    12/1970  Schrenk et al.
3,764,067 A    10/1973  Coffey et al.
(Continued)

FOREIGN PATENT DOCUMENTS

CN    1541830       11/2001
CN    1427910 A     7/2003
(Continued)

OTHER PUBLICATIONS

European Search Report in commonly owned European Application No. 131832180 dated Nov. 26, 2013, pp. 1-5.
(Continued)

*Primary Examiner* — Chinessa T. Golden
(74) *Attorney, Agent, or Firm* — Additon, Higgins & Pendleton, P.A.

(57) ABSTRACT

An article includes a thermoplastic resin, a metal-resin composite particle, and a pore and a method of manufacturing the article. The metal-resin composite particle includes a metal deposition layer, a first coating layer positioned on one side of the metal deposition layer, and a second coating layer positioned on the other side of the metal deposition layer, and the first and second layers include a thermosetting resin respectively.

17 Claims, 8 Drawing Sheets

(51) Int. Cl.
*B05D 3/00* (2006.01)
*B29C 69/00* (2006.01)
*B32B 5/16* (2006.01)
*C08J 9/00* (2006.01)
*C08J 9/12* (2006.01)
*C09C 1/64* (2006.01)
*B29C 45/17* (2006.01)
*B29C 44/34* (2006.01)

(56) References Cited

U.S. PATENT DOCUMENTS

| | | | |
|---|---|---|---|
| 3,932,348 A | | 1/1976 | Camelon et al. |
| 4,544,600 A | * | 10/1985 | Kern .......................... 428/323 |
| 4,621,112 A | | 11/1986 | Backhouse et al. |
| 4,892,779 A | * | 1/1990 | Leatherman et al. ........ 428/220 |
| 5,010,112 A | | 4/1991 | Glicksman et al. |
| 5,332,767 A | | 7/1994 | Reisser et al. |
| 5,334,657 A | | 8/1994 | Swartzmiller et al. |
| 6,428,875 B1 | * | 8/2002 | Takahashi ................ B41M 3/06 428/141 |
| 6,933,044 B2 | | 8/2005 | Ishikawa |
| 7,052,769 B2 | | 5/2006 | Hase et al. |
| 7,485,365 B2 | | 2/2009 | Schuster et al. |
| 7,553,887 B2 | | 6/2009 | Sugimoto et al. |
| 7,820,279 B2 | | 10/2010 | Hiraoka et al. |
| 7,923,099 B2 | | 4/2011 | Park |
| 8,007,902 B2 | | 8/2011 | Smith |
| 8,642,681 B2 | | 2/2014 | Setoguchi |
| 8,946,337 B2 | | 2/2015 | Lee et al. |
| 2002/0013398 A1 | * | 1/2002 | Ido et al. ....................... 524/441 |
| 2005/0042437 A1 | * | 2/2005 | Ramesh .................. C08J 9/0066 428/304.4 |
| 2005/0104214 A1 | | 5/2005 | Maeda et al. |
| 2006/0017193 A1 | | 1/2006 | Asthana et al. |
| 2006/0046057 A1 | | 3/2006 | Huber et al. |
| 2006/0105663 A1 | * | 5/2006 | Greulich et al. .............. 442/394 |
| 2006/0167147 A1 | | 7/2006 | Asgari |
| 2007/0276083 A1 | | 11/2007 | Higashi et al. |
| 2008/0281029 A1 | | 11/2008 | Morvan et al. |
| 2010/0289187 A1 | | 11/2010 | Bae et al. |
| 2012/0064353 A1 | | 3/2012 | Kawaguchi et al. |
| 2012/0065298 A1 | | 3/2012 | Setoguchi |
| 2012/0129992 A1 | | 5/2012 | Kang et al. |
| 2012/0264869 A1 | | 10/2012 | Lee et al. |
| 2012/0270988 A1 | | 10/2012 | Lee et al. |
| 2014/0066563 A1 | | 3/2014 | Kim et al. |
| 2015/0283795 A1 | | 10/2015 | Kim et al. |
| 2015/0353736 A1 | | 12/2015 | Kim et al. |
| 2015/0376396 A1 | | 12/2015 | Lee et al. |

FOREIGN PATENT DOCUMENTS

| | | |
|---|---|---|
| CN | 1495227 | 5/2004 |
| CN | 1616223 | 5/2005 |
| CN | 1692017 | 11/2005 |
| CN | 1750926 | 3/2006 |
| CN | 1764698 A | 4/2006 |
| CN | 101796110 A | 8/2010 |
| EP | 0801335 A1 | 10/1997 |
| EP | 1306483 A1 | 5/2003 |
| EP | 1721939 A1 | 11/2006 |
| JP | 06-285948 | 10/1994 |
| JP | 06-044687 | 11/1994 |
| JP | 07-118561 A | 5/1995 |
| JP | 07-156299 A | 6/1995 |
| JP | 08-074037 | 3/1996 |
| JP | 09-165487 A | 6/1997 |
| JP | 10-000735 | 1/1998 |
| JP | 10-017674 A | 1/1998 |
| JP | 10-182873 A | 7/1998 |
| JP | 11-010791 A | 1/1999 |
| JP | 2000-239394 A | 9/2000 |
| JP | 2001-181515 A | 7/2001 |
| JP | 2001-250992 | 9/2001 |
| JP | 2001-262003 A | 9/2001 |
| JP | 2002-127328 | 5/2002 |
| JP | 2003-019777 | 1/2003 |
| JP | 2003-103733 | 4/2003 |
| JP | 2004-066500 A | 3/2004 |
| JP | 2004-083608 A | 3/2004 |
| JP | 2004-346194 A | 12/2004 |
| JP | 2005-008656 A | 1/2005 |
| JP | 2005-123735 | 5/2005 |
| JP | 3697452 | 8/2005 |
| JP | 2006-026946 A | 2/2006 |
| JP | 2007-118350 A | 5/2007 |
| JP | 2007-137963 A | 6/2007 |
| JP | 2007-190702 A | 8/2007 |
| JP | 2007-326314 A | 12/2007 |
| JP | 2009-035713 A | 2/2009 |
| JP | 2009-046679 A | 3/2009 |
| JP | 2010-201669 | 9/2010 |
| JP | 2010-214790 A | 9/2010 |
| JP | 2011-026537 A | 2/2011 |
| JP | 2011-032313 A | 2/2011 |
| JP | 2011-094056 | 5/2011 |
| JP | 2011-143584 | 7/2011 |
| JP | 2011-183577 A | 9/2011 |
| KR | 10-0227586 | 1/1999 |
| KR | 10-2001-0033813 A | 4/2001 |
| KR | 10-2003-0035897 A | 5/2003 |
| KR | 10-0413082 | 12/2003 |
| KR | 10-2006-0031692 A | 4/2006 |
| KR | 10-2006-0078530 A | 7/2006 |
| KR | 10-2006-0106623 A | 10/2006 |
| KR | 10-0690898 B1 | 2/2007 |
| KR | 10-2007-0025229 A | 3/2007 |
| KR | 10-0693064 | 3/2007 |
| KR | 10-2007-0102717 A | 10/2007 |
| KR | 10-2009-0066577 A | 6/2009 |
| KR | 10-2010-0079612 A | 7/2010 |
| KR | 10-2010-0123421 | 11/2010 |
| KR | 10-1000290 | 12/2010 |
| KR | 10-2011-0008598 A | 1/2011 |
| KR | 10-2011-0057415 | 6/2011 |
| KR | 10-2011-0079465 A | 7/2011 |
| KR | 10-2011-0079466 A | 7/2011 |
| KR | 10-2011-0107034 A | 9/2011 |
| KR | 10-2012-0027280 | 3/2012 |
| KR | 10-2014-0032301 A | 3/2014 |
| TW | 200621902 | 7/2006 |
| WO | 2006/041658 A1 | 4/2006 |
| WO | WO 2006041658 A1 * | 4/2006 |
| WO | 2009/029095 A1 | 3/2009 |
| WO | 2014/065472 A1 | 5/2014 |
| WO | 2014/104490 A1 | 7/2014 |
| WO | 2014/129712 A1 | 8/2014 |

OTHER PUBLICATIONS

Extended European Search Report in counterpart European Application No. 13183216.4 dated Mar. 28, 2014, pp. 1-6.
Search Report in counterpart Chinese Application No. 2013104044803 dated Mar. 26, 2015, pp. 1-3.
Search Report in commonly owned Chinese Application No. 2013104036417 dated Mar. 8, 2015, pp. 1-2.
Search Report in commonly owned Chinese Application No. 201380067877.6 dated Jan. 6, 2016, pp. 1-2.
International Search Report and Written Opinion in commonly owned International Application No. PCT/KR2013/001291, dated Jun. 10, 2013, pp. 1-6.
Garcia et al., "New Fluorinated Polymers Doped with BODIPY Chromophore as Highly Efficient and Photostable Optical Materials," Chem. Mater. 18, 601-602 (2006).
Office Action in commonly owned U.S. Appl. No. 13/872,260 dated Sep. 10, 2014, pp. 1-11.
Office Action in commonly owned U.S. Appl. No. 14/437,058 dated Oct. 27, 2016, pp. 1-2.
Search Report in commonly owned Chinese Application No. 201380073664.4 dated Jul. 26, 2016, pp. 1-2.

(56) References Cited

OTHER PUBLICATIONS

Final Office Action in commonly owned U.S. Appl. No. 13/872,260 dated Apr. 22, 2015, pp. 1-7.
Advisory Action in commonly owned U.S. Appl. No. 13/872,260 dated Jul. 14, 2015, pp. 1-4.
Notice of Allowance in commonly owned U.S. Appl. No. 13/872,260 dated Sep. 28, 2015, pp. 1-5.
International Search Report and Written Opinion in commonly owned International Application No. PCT/KR2013/007904 dated Nov. 26, 2013, pp. 1-7.
Office Action in commonly owned U.S. Appl. No. 14/769,267 dated Jan. 15, 2016, pp. 1-13.
Notice of Allowance in commonly owned U.S. Appl. No. 14/769,267 dated Aug. 16, 2016, pp. 1-5.
International Search Report in commonly owned International Application No. PCT/KR2013/003794 dated Sep. 24, 2013, pp. 1-4.
International Search Report and Written Opinion in commonly owned International Application No. PCT/KR2013/003794 dated Sep. 24, 2013, pp. 1-10.
Search Report in commonly owned Chinese Application No. 201380069442.5 dated Mar. 15, 2016, pp. 1-3.
Notice of Allowance in commonly owned U.S. Appl. No. 14/769,267 dated Dec. 19, 2016, pp. 1-5.
Office Action in commonly owned U.S. Appl. No. 14/655,444 dated Nov. 18, 2016, pp. 1-5

\* cited by examiner

[FIG. 9A]
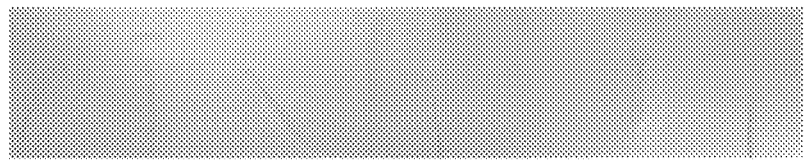
[FIG. 9B]
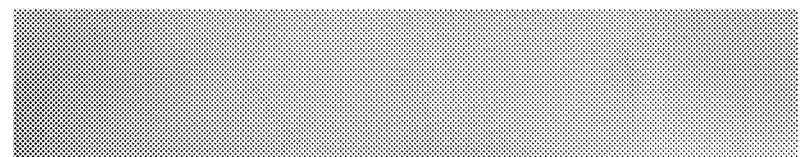
[FIG. 9C]
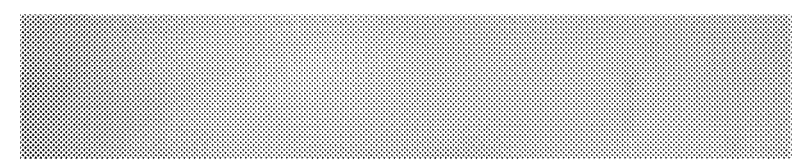
[FIG. 9D]
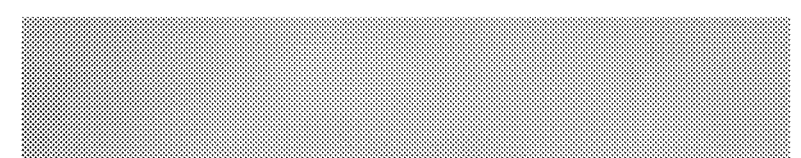

ARTICLE AND MANUFACTURING METHOD OF ARTICLE

CROSS-REFERENCE TO RELATED APPLICATION

This application claims priority to and the benefit of Korean Patent Application No. 10-2012-0099034 filed in the Korean Intellectual Property Office on Sep. 7, 2012, the entire disclosure of which is incorporated herein by reference.

FIELD

An article and a method of manufacturing the article are disclosed.

BACKGROUND

Recently, plastic exterior products with diverse colors have become increasingly popular for electronic parts, automobile parts, and the like. In addition, the plastic exterior products are increasingly exhibiting a high quality sense of touch.

The plastic exterior products usually include a plastic resin and a metal particle to impart to the resin appearance with a metal-like texture. Japanese Patent Laid-Open Publication Nos. 2001-262003 and 2007-137963 disclose the metal-like texture, which is not reproduced in an actual experiment.

For example, Japanese Patent Laid-Open Publication No. 2001-262003 discloses a resin composition including a flake-shaped metal particulate, but a weld line occurs in an actual experiment. Japanese Patent Laid-Open Publication No. 2007-137963 discloses a resin composition including a glass fiber and a metal particle, but the glass fiber causes an appearance defect in an actual experiment.

Accordingly, conventional articles formed by adding a metal particle and the like to a plastic resin may not exhibit a metal-like texture or may have various defects and thus are not suitable replacements for a painted article.

SUMMARY OF THE INVENTION

One embodiment of the present invention provides an article that can have a metal-like texture near to that (similar to that) of a painted article while not being painted and excellent luminance with almost no flow mark or weld line and a method of manufacturing the article.

According to one embodiment of the present invention, provided is an article including a thermoplastic resin, a metal-resin composite particle, and a pore, wherein the metal-resin composite particle includes a metal deposition layer, a first coating layer positioned on one side of the metal deposition layer, and a second coating layer positioned on the other side of the metal deposition layer, wherein the first and second coating layers respectively include a thermosetting resin.

The pore may have an average particle diameter of about 10 μm to about 1000 μm.

The metal deposition layer may be an aluminum deposition layer.

The thermosetting resin may include a phenolic resin, an epoxy resin, an unsaturated polyester resin, an urethane resin, an urea resin, a melamine resin, an alkyd resin, a silicone resin, a vinylester resin, or a combination thereof.

The thermosetting resin may have a refractive index of about 1.45 to about 1.55.

The first and second coating layers may be transparent or translucent.

The metal-resin composite particle may further include at least one thermoplastic resin layer, and the thermoplastic resin layer may be positioned on at least one of the external surfaces of the first and/or second coating layers.

The metal-resin composite particle may be about 1.01 μm to about 100 μm thick.

The metal-resin composite particle may have an average particle diameter of about 2 μm to about 2000 μm.

The metal-resin composite particle may be included in an amount of about 0.1 to about 2.0 parts by weight based on about 100 parts by weight of the thermoplastic resin.

The metal-resin composite particle may be uniformly dispersed in the article.

The thermoplastic resin may include a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin may have a refractive index of about 1.45 to about 1.55.

The thermoplastic resin may be transparent or translucent.

The article may have a flop index of about 11 to about 25, a sparkle intensity of about 8 to about 20, and luminance of about 70 to about 100% measured based on a gloss level at an angle of about 60°.

Another embodiment of the present invention provides a method of manufacturing an article, which includes adding a resin composition including a thermoplastic resin and a metal-resin composite particle to an injection apparatus cylinder, melting/kneading them to prepare a first mixture, injecting a gas into the first mixture to prepare a second mixture, and injection-molding the second mixture to manufacture an article including the thermoplastic resin, the metal-resin composite particles, and a plurality of pores. The metal-resin composite particle includes a metal deposition layer, a first coating layer positioned on one side of the metal deposition layer, and a second coating layer positioned on the other side of the metal deposition layer, wherein the first and second coating layers include a thermosetting resin respectively.

The gas may include nitrogen, carbon dioxide, butane, pentane, or a combination thereof.

The second mixture may be a supercritical fluid.

The pores may have an average particle diameter of about 10 μm to about 1000 μm.

The metal deposition layer may be an aluminum deposition layer.

The thermosetting resin may include a phenolic resin, an epoxy resin, an unsaturated polyester resin, an urethane resin, an urea resin, a melamine resin, an alkyd resin, a silicone resin, or a combination thereof.

The metal-resin composite particle may be about 1.01 μm to about 100 μm thick.

The metal-resin composite particle may have an average particle diameter of about 2 μm to about 2000 μm.

The metal-resin composite particle may be included in an amount of about 0.1 to about 2.0 parts by weight based on about 100 parts by weight of the thermoplastic resin.

The thermoplastic resin may include a polycarbonate resin, a rubber modified vinyl-based copolymer resin, a polyester resin, a polyalkyl(meth)acrylate resin, a polystyrene resin, a styrene-based polymer, a polyolefin resin, or a combination thereof.

The article can have a metal-like texture near to that (similar to that) of a painted article without being painted, and thus can have excellent luminance with almost no flow mark or weld line.

BRIEF DESCRIPTION OF THE DRAWINGS

FIGS. 9A, 9B, 9C, and 9D are reference photographs for evaluating the appearance of the articles of the Examples and Comparative Examples with regard to flow mark or weld line, wherein FIG. 9A depicts an article with a different color of greater than or equal to 70% to less than or equal to 100% in the flow mark or weld line; FIG. 9B depicts an article with a different color of greater than or equal to 50% to less than or equal to 70% in the flow mark or weld line flow mark; FIG. 9C depicts an article with a different color of greater than or equal to 10% to less than or equal to 50% in the flow mark or weld line flow mark; and FIG. 9D depicts an article with a different color of less than or equal to 10% in the flow mark or weld line flow mark.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, a term "(meth)acrylate" may refer to "acrylate" and "methacrylate". The term "(meth)acrylic acid alkyl ester" refers to both "acrylic acid alkyl ester" and "methacrylic acid alkyl ester", and the term "(meth)acrylic acid ester" refers to both "acrylic acid ester" and "methacrylic acid ester".

When a specific definition is not otherwise provided, the term "copolymerization" may refer to block copolymerization, random copolymerization, graft copolymerization, or alternate copolymerization, and the term "copolymer" may refer to a block copolymer, a random copolymer, a graft copolymer, or an alternate copolymer.

When a specific definition is not otherwise provided, the average particle diameter and thickness of an article are respectively obtained by sampling a part of the article and measuring particle diameters and thicknesses of greater than or equal to about 50 particles and calculating arithmetic means of the particle diameter and thickness measurements of the rest of the particles except for the top 10% and bottom 10% of the particles based on the SEM image through an analysis of the cross section of the article based on a scanning electron microscope (SEM, S4800, Hitachi Inc.).

Figure 1:
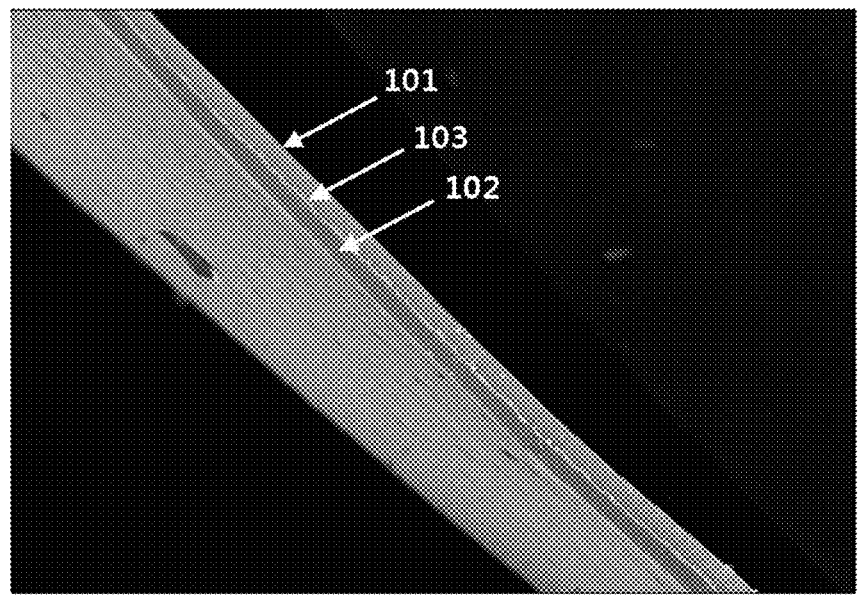
FIG. 1 is a scanning electron microscope (SEM) photograph showing one side of a metal-resin composite particle according to one embodiment of the present invention.

Referring to FIG. 1, in one embodiment of the present invention, an article includes a thermoplastic resin, a metal-resin composite particle, and a pore, wherein the metal-resin composite particle includes a metal deposition layer 103, a first coating layer 101 positioned on one side of the metal deposition layer, and a second coating layer 102 positioned on the other side of the metal deposition layer, and the first and second coating layers respectively include a thermosetting resin.

Metal-Resin Composite Particle

The metal-resin composite particle includes a metal deposition layer that can have a high flatness and thus may provide high luminance and/or excellent metal-like texture. Accordingly, when the metal-resin composite particle is used to prepare a resin composition and then, to fabricate an article, the article may have a metal-like texture and/or luminance similar to those of a painted article without being painted.

The metal deposition layer may be an aluminum deposition layer. Accordingly, the article including the aluminum deposition layer may have an excellent metal-like texture, which may be similar to a silver gloss.

The metal deposition layer may have a thickness of about 0.01 to about 1.0 μm, for example about 0.01 to about 0.9 μm, about 0.01 to about 0.8 μm, about 0.01 to about 0.7 μm, about 0.01 to about 0.6 μm, about 0.01 to about 0.5 μm, about 0.05 to about 1.0 μm, about 0.1 to about 1.0 μm, about 0.2 to about 1.0 μm, about 0.3 to about 1.0 μm, or about 0.4 to about 1.0 μm.

In some embodiments, the metal deposition layer may have a thickness of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1.0 μm. Further, according to some embodiments of the present invention, the metal deposition layer may have a thickness from about any of the foregoing amounts to about any other of the foregoing amounts.

The metal deposition layer may be thinner than conventional metal particles prepared by grinding a metal foil and the like.

When the metal deposition layer has a thickness within the above range, a metal-resin composite particle having the metal deposition layer may have very excellent flatness. When this metal-resin composite particle is used to fabricate an article, the article may have a metal-like texture similar to that of a painted article without being painted and also can have excellent luminance and/or almost no flow mark and weld line problem.

The metal-resin composite particle includes first and second coating layers and may be uniformly dispersed in the article.

The first and second coating layers respectively include a thermosetting resin, which may be the same or different, and thus, are not melted nor separated but cause a chemical reaction with the thermoplastic resin when the metal-resin composite particle along with the thermoplastic resin is melted/kneaded at a high process temperature. Accordingly, the metal-resin composite particle is not modified but maintains a shape and property at a high process temperature.

Examples of the thermosetting resin may include without limitation phenolic resins, epoxy resins, unsaturated polyester resins, urethane resins, urea resins, melamine resins, alkyd resins, silicone resins, vinylester resins, and the like, and combinations thereof.

At least one of the first and second coating layers may further include an additive, and the additive may include polyvinyl butyral (PVB).

When at least one of the first and second coating layers further includes the additive, adherence between the metal deposition layer and the first coating layers and/or between the metal deposition layer and the second coating layer and/or transparency of the first coating layer and/or the second coating layer can be improved, and luminance and the like of the metal-resin composite particle can also be improved. Accordingly, the metal-resin composite particle can be very well dispersed in the article, which can provide excellent luminance.

Each thermosetting resin of the first and second coating layers may have a refractive index that is the same or different from each other and independently ranges from about 1.45 to about 1.55.

When the thermosetting resin included in the first and second coating layers has a refractive index within the above range, the article including the metal-resin composite particle can have a very excellent metal-like texture and/or luminance.

In particular, when the thermosetting resins respectively included in the first and second coating layers have a similar refractive index to each other, the article may have a metal-like texture that is similar to that of a painted article without being painted and/or can have very excellent luminance and/or almost no flow mark and weld line problem.

The first and second coating layers may each have thickness that is the same or different from each other and independently ranges from about 0.5 to about 10 μm, for example, about 0.5 to about 9 μm, about 0.5 to about 8 μm, about 0.5 to about 7 μm, about 0.5 to about 6 μm, about 0.5 to about 5 μm, about 1 to about 10 μm, about 2 to about 10 μm, about 3 to about 10 μm, or about 4 to about 10 μm.

In some embodiments, the first and second coating layers may each independently have a thickness of about 0.5, 0.6, 0.7, 0.8, 0.9, 1, 2, 3, 4, 5, 6, 7, 8, 9, or 10 μm. Further, according to some embodiments of the present invention, the first and second coating layers may each independently have a thickness from about any of the foregoing amounts to about any other of the foregoing amounts.

When the first and second coating layers have a thickness within the above range, the metal-resin composite particle can have very excellent flatness. Accordingly, the article including the metal-resin composite particle can have a metal-like texture that is similar to that of a painted article without being painted and/or also can have very excellent luminance and/or almost no flow mark and weld line.

The first and second coating layers independently may be transparent or translucent. The first and second coating layers may each have a haze that is the same or different from each other and independently ranges from about 0.5 to about 40%, for example, about 0.5% to about 40%, about 0.5% to about 35%, about 0.5% to about 30%, about 0.5% to about 25%, about 0.5% to about 20%, or about 0.5% to about 15%.

In some embodiments, the first and second coating layers may each independently have a haze of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40%. Further, according to some embodiments of the present invention, the first and second coating layers may each independently have a haze from about any of the foregoing amounts to about any other of the foregoing amounts.

The term transparency of the first and second coating layers indicates that the layers transmit all the incident lights. The term translucence thereof indicates that the layers partially transmit all the incident lights.

The term haze indicates a degree of opaqueness or cloudiness.

The haze is calculated according to the following equation 1 in the present specification.

$$\text{haze (\%)} = \{\text{diffused light}/(\text{diffused and transmitted light} + \text{parallel transmitted light})\} \times 100 \qquad \text{[Equation 1]}$$

When the first and second coating layers are transparent or translucent, that is, the first and second coating layers have a haze within the above range, the metal-resin composite particle may provide high luminance and/or excellent metal-like texture. Accordingly, the article including the metal-resin composite particle can have a metal-like texture that is similar to that of a painted article without being painted and/or can have very excellent luminance.

The metal-resin composite particle may have a multilayer structure.

The metal-resin composite particle may have a sandwich laminated structure.

The metal-resin composite particle may have a multilayer structure having three or more layers.

The metal-resin composite particle may further include at least one thermoplastic resin layer.

The thermoplastic resin layer may be positioned on at least one or both of the external surfaces of the first and second coating layers.

When the thermoplastic resin layer is further included, the first and/or second coating layer may be more uniformly thick, and the metal deposition layer may have improved flatness. Accordingly, the metal-resin composite particle may have very excellent flatness.

Examples of the thermoplastic resin layer may include without limitation polycarbonate resins, rubber modified vinyl-based copolymer resins, polyester resins, polyalkyl (meth)acrylate resins, styrene-based polymers, polyolefin resins, and the like, and combinations thereof.

The thermoplastic resin layer may include a different material from the first coating layer. The thermoplastic resin layer may also include a different material from the second coating layer.

The metal-resin composite particle may have a thickness of about 1.01 to about 100 μm, for example about 1.01 to about 90 μm, about 1.01 to about 80 μm, about 1.01 to about 70 μm, about 1.01 to about 60 μm, about 1.01 to about 50 μm, about 2.0 to about 100 μm, about 3.0 to about 100 μm, about 4.0 to about 100 μm, about 5.0 to about 100 μm, about 10 to about 100 μm, about 20 to about 100 μm, about 30 to about 100 μm, or about 40 to about 100 μm.

When the metal-resin composite particle has a thickness within the above range, the metal-resin composite particle may provide high luminance and/or excellent metal-like texture. Accordingly, the article including the metal-resin composite particle may have a metal-like texture that is similar to that of a painted article without being painted and/or also can have very excellent luminance and/or almost no flow mark and weld line problem.

The metal-resin composite particle may have an average particle diameter of about 2 to about 2,000 μm, for example about 2 to about 1,500 μm, about 2 to about 1,000 μm, about 2 to about 900 μm, about 2 to about 800 μm, about 2 to about 700 µm, about 2 to about 600 µm, about 2 to about 500 µm, about 10 to about 1,000 µm, about 20 to about 1,000 µm, about 30 to about 1,000 µm, about 40 to about 1,000 µm, or about 50 to about 1,000 µm.

When the metal-resin composite particle has an average particle diameter within the above range, the metal-resin composite particle may provide high luminance and/or excellent metal-like texture. Accordingly, the article including the metal-resin composite particle can have a metal-like texture that is similar to that of a painted article without being painted and/or can have a very high luminance and/or almost no flow mark and weld line problem.

In addition, when the metal-resin composite particle has an average particle diameter within the above range, the metal-resin composite particle can be uniformly dispersed in the article and thus can improve the metal-like texture of the article and/or luminance and/or suppress generation of a flow mark and a weld line.

In addition, when the metal-resin composite particle has an average particle diameter within the above range, the metal-resin composite particle can be effectively supported by the post-described pores. Herein, the flat surface of the metal-resin composite particle becomes almost parallel to the surface of the article. Accordingly, the metal-resin composite particle can improve the metal-like texture and/or luminance of the article and can suppress a flow mark and weld line problem during the injection-molding.

The thermoplastic resin can include the metal-resin composite particle in an amount of about 0.1 to about 2.0 parts by weight based on about 100 parts by weight of the thermoplastic resin, for example about 0.1 to about 1.9 parts by weight, about 0.1 to about 1.8 parts by weight, about 0.1 to about 1.7 parts by weight, about 0.1 to about 1.6 parts by weight, about 0.1 to about 1.5 parts by weight, about 0.1 to about 1.4 parts by weight, about 0.1 to about 1.3 parts by weight, about 0.1 to about 1.2 parts by weight, about 0.1 to about 1.1 parts by weight, about 0.1 to about 1.0 parts by weight, about 0.2 to about 2.0 parts by weight, about 0.3 to about 2.0 parts by weight, about 0.4 to about 2.0 parts by weight, about 0.5 to about 2.0 parts by weight, about 0.6 to about 2.0 parts by weight, about 0.7 to about 2.0 parts by weight, about 0.8 to about 2.0 parts by weight, or about 0.9 to about 2.0 parts by weight based on 100 parts by weight of thermoplastic resin.

In some embodiments, the thermoplastic resin can include the metal-resin composite particle in an amount of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 parts by weight. Further, according to some embodiments of the present invention, the amount of the metal-resin composite particle can be in a range from about any of the foregoing amounts to about any other of the foregoing amounts.

When the thermoplastic resin includes the metal-resin composite particle in an amount within the above range, the article including the metal-resin composite particle can have a metal-like texture that is similar to that of a painted article without being painted and/or very excellent luminance and/or almost no flow mark and weld line problem.

The metal-resin composite particle may be uniformly dispersed in the article including the same.

In general, since metal particles have a higher density than a thermoplastic resin, the metal particles are typically densely distributed in a center layer with a reference to cross section of the article when an article is fabricated through injection-molding using a resin composition including metal particles and the thermoplastic resin. Accordingly, the metal particles are distributed in the center layer of the article when the metal particles are added to the thermoplastic resin to prepare a conventional resin composition and into the article. The conventional article accordingly may not have an excellent metal-like texture and luminance, and appears different from the appearance of a painted article. In addition, the article may have a flow mark and weld line problem on the surface during the injection-molding.

In contrast, when a resin composition including the metal-resin composite particle according to one embodiment of the present invention is fabricated into an article, the metal-resin composite particle is not distributed in the center layer of the article with a reference of the cross section of the article but uniformly in (throughout) the article.

The metal-resin composite particle may have a sheet-shape.

The metal-resin composite particle can have a flat surface, and the flat surface is almost parallel to the surface of the article. In other words, the flat surface may have an angle of about 0° to about 30° with a reference of the surface of the article.

In general, when conventional metal particles are prepared into a resin composition and then, fabricated into an article, the article includes plenty of the metal particles, of which the flat surface is not parallel to the surface of the article. When the more non-parallel metal particles are included, the article may have lower luminance and deteriorated metal-like texture. In addition, the article may have a severe flow mark and weld line problem during the injection-molding.

In contrast, when metal-resin composite particles in accordance with the invention are parallel to the surface of an article, the article may have a very excellent metal-like texture and/or luminance. In addition, the article may be suppressed from a flow mark and weld line problem during the injection-molding.

The metal-resin composite particles may be prepared by depositing a metal on one surface of a first coating layer as a substrate to form a metal deposition layer and then forming a second coating layer on the external surface of the metal deposition layer.

The first and second coating layers may be respectively formed by respectively coating a thermosetting resin composition and curing the thermosetting resin composition by a conventional curing method such as thermal curing or UV curing.

The method of depositing a metal may include a conventional deposition method without a particular limit. Examples of metal deposition methods include without limitation sputtering, E-beam evaporation, thermal evaporation, laser molecular beam epitaxy (L-MBE), pulsed laser deposition (PLD), metal-organic chemical vapor deposition (MOCVD), hydride vapor phase epitaxy (HVPE), and the like.

Another method of forming the metal-resin composite particle may include forming a first coating layer on one side of a thermoplastic resin layer, depositing a metal to form a metal deposition layer, and forming a second coating layer on the external surface of the metal deposition layer. In addition, a first coating layer may be formed on the other side of the thermoplastic resin layer having the first coating layer, the metal deposition layer, and the second coating layer, and then after a metal deposition layer is formed thereon, a second coating layer can be formed on an on the external surface of the metal deposition layer.

The metal-resin composite particle may be prepared singularly or in a mixture of the manufacturing methods. The method may be more than one time repetitively applied to form multi-layered metal-resin composite particles.

Pores

The pores can improve luminance and/or metal-like texture of an article and can play a role of suppressing a flow mark and weld line problem during the injection-molding.

The pores may be uniformly dispersed in the article.

The pores around the surface of the article have a scattered reflection and reduce deficiency of metal-like texture and luminance. In other words, the pores can improve metal-like texture and/or luminance of the article.

The pores near to the metal-resin composite particles may support the metal-resin composite particles and thus, can help position the flat surface of the metal-resin composite particles almost parallel to the surface of the article. Accordingly, the article may have improved metal-like texture and/or luminance and/or almost no flow mark and weld line problem.

The pores may have an average particle diameter of about 10 μm to about 1000 μm, for example about 10 μm to about 900 μm, about 10 μm to about 800 μm, about 10 μm to about 700 μm, about 10 μm to about 600 μm, about 10 μm to about 500 μm, about 10 μm to about 400 μm, about 10 μm to about 300 μm, about 10 μm to about 200 μm, about 50 μm to about 1000 μm, about 100 μm to about 1000 μm, about 100 μm to about 900 μm, about 100 μm to about 800 μm, about 100 μm to about 700 μm, about 100 μm to about 600 μm, about 100 μm to about 500 μm, about 100 μm to about 400 μm, about 100 μm to about 300 μm, or about 100 μm to about 200 μm.

When the pores have an average particle diameter within the above range, the pores may easily support the metal-resin composite particles and improve metal-like texture and/or luminance of an article including the same. Accordingly the article can have almost no flow mark and weld line problem.

The pores may be formed using various gases. Examples of the gases may include without limitation nitrogen, carbon dioxide, butane, pentane, and the like, and combinations thereof.

Thermoplastic Resin

The thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin may have a refractive index of about 1.45 to about 1.55.

When the thermoplastic resin has a refractive index within the above range, an article including the same may have excellent metal-like texture and/or luminance.

In particular, when both of the thermosetting resins included in the first and second coating layers have a similar refractive index, the article may have a metal-like texture that is similar to that of a painted article without painting and/or also can have excellent luminance and/or almost no flow mark and weld line problem during the injection-molding.

The thermoplastic resin may be transparent or translucent. The thermoplastic resin may have a haze of about 0.5 to about 40%, for example about 0.5% to about 35%, about 0.5% to about 30%, about 0.5% to about 25%, about 0.5% to about 20%, about 0.5% to about 15%.

In some embodiments, the thermoplastic resin may have a haze of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40%. Further, according to some embodiments of the present invention, the thermoplastic resin may have a haze from about any of the foregoing amounts to about any other of the foregoing amounts.

The term transparency indicates that all the incident lights are almost transmitted, and the term translucence indicates that all the lights are partially transmitted.

When the thermoplastic resin is transparent or translucent, that is, has a haze within the above range, an article including the metal-resin composite particle may have a metal-like texture that is similar to that of a painted article without being painted and/or can also have very excellent luminance.

The thermoplastic resin may be any well-known transparent or translucent resin. For example, as described herein, the thermoplastic resin may be a polycarbonate resin, a rubber modified vinyl-based copolymer resin, a polyester resin, a polyalkyl(meth)acrylate resin, a styrene-based polymer, a polyolefin resin, or a combination thereof.

The thermoplastic resin may provide basic properties such as impact resistance, heat resistance, flexural characteristics, tensile characteristics, and the like.

The polycarbonate resin may be prepared by reacting one or more diphenols with a compound of a phosgene, halogen formate, carbonate ester, or a combination thereof.

Examples of the diphenols include without limitation hydroquinone, resorcinol, 4,4'-dihydroxydiphenyl, 2,2-bis (4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis (4-hydroxyphenyl)ether, and the like, and combinations thereof. Of the diphenols, 2,2-bis(4-hydroxyphenyl)propane, 2,2-bis(3,5-dichloro-4-hydroxyphenyl)propane and/or 1,1-bis(4-hydroxyphenyl)cyclohexane may be used, for example 2,2-bis(4-hydroxyphenyl)propane may be used.

The polycarbonate resin may have a weight average molecular weight of about 10,000 to about 200,000 g/mol, for example, about 15,000 to about 80,000 g/mol without limitation.

The polycarbonate resin may be a mixture of copolymers obtained using two or more dipenols that differ from each other. The polycarbonate resin may include a linear polycarbonate resin, a branched polycarbonate resin, a polyestercarbonate copolymer resin, and the like, or a combination thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with diphenols and a carbonate. The multi-functional aromatic compound may be included in an amount of about 0.05 to about 2 mol % based on the total weight of the branched polycarbonate resin. The polyester carbonate copolymer resin may be produced by reacting difunctional carboxylic acid with diphenols and a carbonate. The carbonate may include diaryl carbonate such as diphenyl carbonate, ethylene carbonate, and the like.

The rubber modified vinyl-based copolymer resin may include about 5 to about 95 wt % of a vinyl-based polymer and about 5 to about 95 wt % of a rubbery polymer.

The rubbery polymer may include a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, or a combination thereof.

The vinyl-based polymer may be a polymer of about 50 to about 95 wt % of a first vinyl-based monomer including an aromatic vinyl monomer, an acrylic-based monomer, a heterocyclic monomer, or a combination thereof; and about 5 to about 50 wt % of a second vinyl-based monomer including an unsaturated nitrile monomer, an acrylic-based monomer, a heterocyclic monomer, or a combination thereof.

Examples of the aromatic vinyl monomer may include without limitation styrene, C1 to C10 alkyl-substituted styrene, halogen-substituted styrene, and the like, and combinations thereof. Examples of the alkyl-substituted styrene may include without limitation o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth) acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof. In exemplary embodiments methyl(meth)acrylate may be used. Examples of the (meth)acrylic acid ester may include without limitation (meth) acrylate and the like.

Examples of the heterocyclic monomer may include without limitation maleic anhydride, C1-C10 alkyl- and/or phenyl N-substituted maleimides, and the like, and combinations thereof.

Examples of the unsaturated nitrile monomer may include without limitation acrylonitrile, methacrylonitrile, ethacrylonitrile, and the like, and combinations thereof.

When the rubber modified vinyl-based graft copolymer resin is prepared, a rubber particle may have a particle diameter of about 0.1 to about 1 μm to improve the impact resistance and surface characteristics of an article, and when the particle diameter of the rubber particle ranges from about 0.1 to about 1 μm, excellent impact strength may be secured.

The rubber modified vinyl-based copolymer resin may be used singularly or as a mixture of two or more.

Specific examples of the rubber modified vinyl-based copolymer resin may include a styrene, acrylonitrile, and optionally methyl(meth)acrylate graft-copolymerized on a butadiene rubber, an acrylic rubber, or a styrene/butadiene rubber as a mixture.

Another example of the rubber modified vinyl-based copolymer resin may be a copolymer including methyl (meth)acrylate graft-copolymerized with a butadiene rubber, an acrylic rubber, or a styrene/butadiene rubber.

The method of preparing the rubber modified vinyl-based graft copolymer resin is widely known to those skilled in the art, and may be any one of emulsion polymerization, suspension polymerization, solution polymerization or massive polymerization.

The polyester resin is an aromatic polyester resin and may include a condensation-polymerized resin obtained from melt polymerization of terephthalic acid or alkylester terephthalate, and a C2 to C10 glycol component. As used herein, the alkyl may be a C1 to C10 alkyl.

Examples of the aromatic polyester resin may include without limitation a polyethylene terephthalate resin, a polytrimethylene terephthalate resin, a polybutylene terephthalate resin, a polyhexamethylene terephthalate resin, a polycyclohexane dimethylene terephthalate resin, a polyester resin modified into a non-crystalline resin by mixing the resins with another monomer, and the like, an combinations thereof. Among these, a polyethylene terephthalate resin, a polytrimethylene terephthalate resin, a polybutylene terephthalate resin, and/or a non-crystalline polyethylene terephthalate resin may be used, and for example, a polybutylene terephthalate resin and/or a polyethylene terephthalate resin may be used.

The polyethylene terephthalate resin may be a condensation-polymerized polymer obtained through a direct ester reaction or an ester exchange reaction of an ethyleneglycol monomer and a terephthalic acid or dimethyl terephthalate monomer.

In addition, in order to increase the impact strength of the polyethylene terephthalate resin, the polyethylene terephthalate resin may be copolymerized with polytetramethyleneglycol (PTMG), polyethyleneglycol (PEG), polypropyleneglycol (PPG), a low molecular-weight aliphatic polyester, or aliphatic polyamide, and/or it may be used in the form of a modified polyethylene terephthalate resin obtained by blending with a component improving an impact strength.

The polyalkyl(meth)acrylate resin may be obtained by polymerizing a monomer material including an alkyl(meth) acrylate through a known polymerization method, such as a suspension polymerization method, a massive polymerization method, an emulsion method and the like.

The alkyl(meth)acrylate may have a C1 to C10 alkyl group, and may include methyl(meth)acrylate, ethyl(meth)acrylate, butyl(meth)acrylate, glycidyl(meth)acrylate, hydroxyethyl(meth)acrylate, and the like, and combinations thereof.

The polyalkyl(meth)acrylate may have a weight average molecular weight of about 10,000 to about 200,000 g/mol, for example about 15,000 to about 150,000 g/mol. When the polyalkyl(meth)acrylate has a weight average molecular weight within the above range, hydrolysis resistance, scratch resistance, workability, and the like may be improved.

The styrene-based polymer may be a polymer including about 20 to about 100 wt % of a styrene-based monomer; and about 0 to about 80 wt % of a vinyl-based monomer including an acrylic-based monomer, a heterocyclic monomer, an unsaturated nitrile monomer, or a combination thereof. The styrene-based polymer may be for example a rubber modified styrene-based polymer such as a rubber-reinforced polystyrene resin (HIPS).

Examples of the styrene-based monomer may include without limitation styrene, C1 to C10 alkyl-substituted styrene, halogen-substituted styrene, and the like, and combinations thereof. Examples of the alkyl-substituted styrene may include without limitation o-ethyl styrene, m-ethyl styrene, p-ethyl styrene, α-methyl styrene, and the like and combinations thereof.

Examples of the acrylic-based monomer may include without limitation (meth)acrylic acid alkyl esters, (meth) acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth)acrylate, butyl(meth)acrylate, and the like, and combinations thereof. Among these, methyl(meth)acrylate may be used. Examples of the (meth)acrylic acid ester may include without limitation (meth)acrylate, and the like.

Examples of the heterocyclic monomer may include without limitation maleic anhydride, C1-C10 alkyl- and/or phenyl N-substituted maleimides, and the like, and combinations thereof.

Examples of the unsaturated nitrile monomer may include without limitation acrylonitrile, methacrylonitrile, ethacrylonitrile, and the like, and combinations thereof.

Examples of the styrene-based polymer may include without limitation a copolymer of a styrene-based monomer and an unsaturated nitrile monomer, a copolymer of a styrene-based monomer and an acrylic-based monomer, a copolymer of a styrene-based monomer, an unsaturated nitrile monomer, and an acrylic-based monomer, a styrene-based homopolymer of a styrene-based monomer, and the like, and combinations thereof.

The styrene-based polymer may have a weight average molecular weight of about 40,000 to about 500,000 g/mol.

The styrene-based polymer may be prepared using emulsion polymerization, suspension polymerization, solution polymerization, massive polymerization, and the like.

Examples of the polyolefin resin may include without limitation polyethylene resins (PE), polypropylene resins (PP), copolymers thereof, and the like, and combinations thereof.

The thermoplastic resin may be an alloy including two or more kinds of resins.

Other Additive(s)

The article may further include one or more additives. Examples of the additives may include without limitation antibacterial agents, heat stabilizers, antioxidants, release agents, light stabilizers, surfactants, coupling agents, plasticizers, admixtures, colorants, stabilizers, lubricants, antistatic agents, coloring aids, flame proofing agents, weather-resistance agents, ultraviolet (UV) absorbers, ultraviolet (UV) blocking agents, nucleating agents, adhesion aids, adhesives, and the like, and combinations thereof.

Examples of the antioxidant may include without limitation phenol antioxidants, phosphite antioxidants, thioether antioxidants, amine antioxidants, and the like, and combinations thereof.

Examples of the release agent may include without limitation fluorine-included polymers, silicon oils, stearic metal salts, montanic metal salts, montanic ester waxes, polyethylene waxes, and the like, and combinations thereof.

Examples of the weather-resistance agent may include without limitation benzophenone-type weather-resistance agents, amine-type weather-resistance agents, and the like, and combinations thereof.

Examples of the colorant may include without limitation dyes, pigments, and the like, and combinations thereof.

Examples of the ultraviolet (UV) ray blocking agent may include without limitation titanium oxide ($TiO_2$), carbon black, and the like and combinations thereof.

Examples of the nucleating agent may include without limitation talc, clay, and the like, and combinations thereof.

The additive may be included in a predetermined amount as long as it does not deteriorate the properties of the article. The additive(s) may be included in an amount of less than or equal to about 40 parts by weight, for example about 0.1 to about 30 parts by weight based on about 100 parts by weight of the thermoplastic resin.

The article may be manufactured by various processes such as injection-molding, blow molding, extrusion molding, thermal molding, and the like. In particular, the article can have almost no flow mark and weld line problem and can have a metal-like texture appearance and thus, may be used in the manufacture of exterior plastic products such as but not limited to IT products, home appliances, interior/exterior auto parts, furniture, interior items, miscellaneous goods, and the like.

Accordingly, the article according to one embodiment of the present invention can have an excellent metal-like texture. In the present invention, the metal-like texture is evaluated using a flop index.

The flop index may be calculated according to the following Equation 1.

$$\text{Flop Index} = \frac{2.69(L^*_{15°} - L^*_{110°})^{1.11}}{(L^*_{45°})^{0.86}} \quad \text{[Equation 1]}$$

In Equation 1, $L^*(x°)$ indicates luminance measured at $x°$.

The flop index is obtained by measuring reflectivity change while an angle of reflection is revolved and specifically by measuring luminance ($L^*$) at each angle of reflection of about 15°, 45° and 110° and then, calculating the measurements according to the Equation 1. In one embodiment of the present invention, the flop index is measured using a BYK Mac spectrophotometer (BYK Inc.).

For example, one surface having no metal-like texture has a flop index of 0, a metal has a flop index ranging from about 15 to about 17, a metal-like texture coating used for an automobile body paint has a flop index of about 11; and the metal-like texture sensed by the naked eye has a flop index of greater than or equal to about 6.5.

According to one embodiment of the present invention, an article may have a flop index ranging from about 11 to about 25. For example, the flop index may be in a range of about 11 to about 20 and as another example, about 11 to about 15.

Accordingly, the article according to one embodiment can have an excellent metal particle texture. The metal particle texture uses a sparkle intensity as an index. The sparkle intensity may be obtained according to the following Equation 2.

$$\Delta S_{total} = \sqrt{\frac{\Delta S^2_{15°} + \Delta S^2_{45°} + \Delta S^2_{75°} + \Delta G^2}{4}} \quad \text{[Equation 2]}$$

Figure 4:
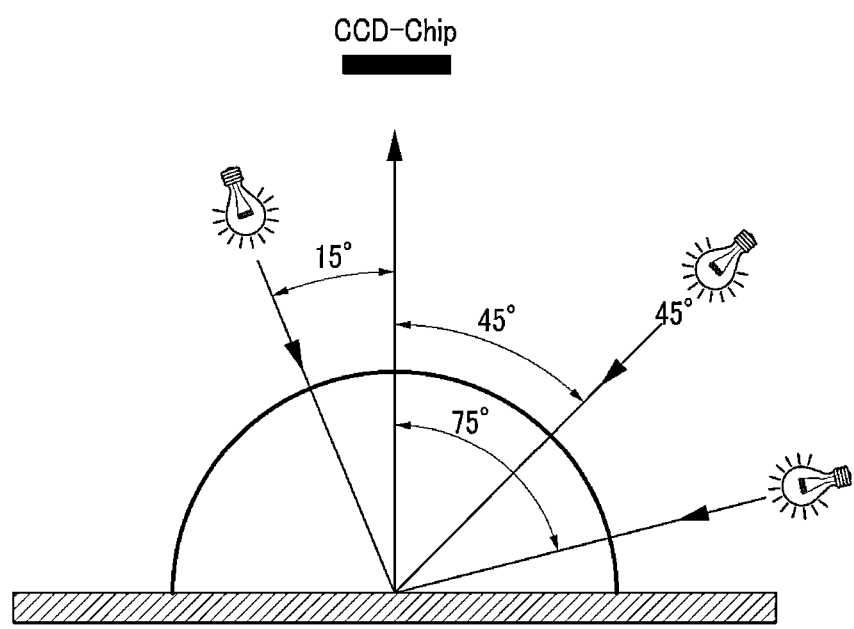
FIG. 4 is a schematic view showing a method of measuring the metal particle texture of an article according to the present invention.

In Equation 2, $\Delta S(x°)$ indicates sparkle intensity measured at $x°$, and $\Delta G$ is diffusion of each $\Delta S(x°)$ and indicates graininess of metal particles. The sparkle intensity ($\Delta S_{total}$) of the article is calculated according to the Equation 2 after measuring each sparkle intensity at about 15°, 45°, and 75°. The method of measuring the sparkle intensity is schematically provided in FIG. 4. In the present invention, the sparkle intensity is measured using a MA98 multi-angle spectrophotometer (X-Rite Inc.).

The sparkle intensity calculated according to Equation 2 is obtained by combining the following factors.

[Four Factors]

① Reflectivity of individual metal particle
② Amounts of metal particle
③ Sizes of metal particle
④ Orientation of metal particle The article according to one embodiment of the present invention may have a sparkle intensity of about 8 to about 20, for example, about 8 to about 15, or about 8 to about 10.

The article according to one embodiment of the present invention may have improved luminance.

In the present invention, the luminance as an index showing brightness such as metal gloss is measured using a gloss level at about 60° with an UGV-6P digital variable glossmeter (SUGA Inc.).

The article according to one embodiment of the present invention may have luminance of about 70 to about 100%, for example about 70 to about 95%, about 75 to about 100%, about 75 to about 95%, about 80 to about 100%, about 80 to about 95%, about 85 to about 100%, or about 85 to about 95%.

Accordingly, the article according to one embodiment of the present invention may have a metal-like texture and/or luminance that is similar to that of a painted article without being painted. In addition, the article may have almost no flow mark and weld line problem.

In another embodiment of the present invention, a method of manufacturing an article includes adding a resin composition including a thermoplastic resin and a metal-resin composite particle to an injection apparatus cylinder and then, melting/kneading the resin composition to prepared a first mixture, injecting a gas into the first mixture to prepare a second mixture, and injection-molding the second mixture to manufacture an article, wherein the metal-resin composite particle includes a metal deposition layer, a first coating layer positioned on one side of the metal deposition layer, and a second coating layer positioned on the other side of the metal deposition layer, the first coating layer and second coating layer includes a thermosetting resin respectively, and the article includes pores.

The thermoplastic resin and metal-resin composite particle are the same as described in the article according to one embodiment of the present invention, and thus, descriptions thereof are omitted.

In the process of injecting the gas into the first mixture, the gas may be nitrogen, carbon dioxide, butane, pentane or a combination thereof.

When the gas is injected into the first mixture, the injection apparatus cylinder has a sharply increased internal pressure. Herein, the second mixture of the thermoplastic resin, the metal-resin composite particle, and the gas is a single liquid and a supercritical fluid. In addition, the second mixture has sharply decreased viscosity. The second mixture having lower viscosity is injected and then, sharply solidified and molded before orientation (angle) of the metal-resin composite particles are changed. Herein, the metal-resin composite particles have a remarkably improved flow mark or weld line problem during the injection-molding.

In addition, the injection of the gas into the first mixture may form a pore in an article. The pores can improve luminance and metal-like texture of the article and suppress a flow mark and weld line problem during the injection-molding. The pore is the same as described in the article according to one embodiment of the present invention.

The preparation of the second mixture by mixing the thermoplastic resin, the metal-resin composite particle, and the gas in the injection apparatus is performed at about 200° C. to about 300° C.

Hereinafter, the present invention is illustrated in more detail with reference to examples. However, they are exemplary embodiments of the present invention, and the present invention is not limited thereto.

EXAMPLES

Articles were fabricated with the following compositions under the conditions provided in Table 1.

TABLE 1

| Components | unit | Examples | | | | Comparative Examples | | | | | |
| --- | --- | --- | --- | --- | --- | --- | --- | --- | --- | --- | --- |
| | | 1 | 2 | 3 | 4 | 1 | 2 | 3 | 4 | 5 | 6 |
| Polyalkyl(meth)acrylate resin (A) | wt % | 100 | 100 | 100 | 100 | 100 | 100 | 100 | 100 | 100 | 100 |
| $N_2$ gas injection | — | ○ | ○ | ○ | ○ | x | x | x | ○ | ○ | — |
| Metal-resin composite particle (B) | parts by weight | 0.2 | 0.3 | 0.5 | 0.2 | 0.3 | — | — | — | — | — |
| Metal particle-1 (C) | parts by weight | — | — | — | 0.3 | — | 0.3 | — | 0.3 | — | — |
| Metal particle-2 (D) | parts by weight | — | — | — | — | — | — | 0.3 | — | 0.3 | — |

(Note):
an article is painted with aluminum in Comparative Example 6.

Each component used in Table 1 is illustrated as follows.

(A) Polyalkyl(meth)acrylate resin: a transparent polymethylmethacrylate resin (Cheil Industries Inc., Korea) having a refractive index of 1.48 and a haze of 3.2 mm-thick specimen of 0.7%.

(B) Metal-resin composite particle: a metal-resin composite particle including an aluminum vacuum deposition layer, a first coating layer on one side of the aluminum vacuum deposition layer, and a second coating layer on the other side of the aluminum vacuum deposition layer. The first and second coating layers include 70 wt % of a silicone resin and 30 wt % of polyvinyl butyral (PVB) and have a refractive index of 1.47. The metal-resin composite particle has an average particle diameter of about 100 μm and an average thickness of about 1.4 μm.

(C) Metal particle-1: An amorphous sheet-shaped aluminum particle having an average particle diameter of about 100 μm and a thickness of about 20 μm (Nihonboitz, Japan).

(D) Metal particle-2: An amorphous sheet-shaped aluminum particle having an average particle diameter of about 8 μm and a thickness of about 0.1 μm (Silberline Manufacturing Co., Ltd. USA).

Examples 1 to 4 and Comparative Examples 1 to 6

The aforementioned components are used in the amounts in Table 1 to prepare resin compositions according to Examples 1 to 4 and Comparative Examples 1 to 6. The resin compositions are extruded through a conventional twin-screw extruder at a temperature ranging from 180 to 240° C. and then, fabricated into a pellet.

The pellets are dried at 80° C. for 4 hours and then, put in an injection molder having injection capability of 6 Oz, and $N_2$ gas is injected into an injection-molding machine cylinder and mixed together therein. Herein, the cylinder is set at a temperature of 220 to 250° C., a molding temperature of 100° C., and a molding cycle time of 30 seconds, and then, article specimens (width×length×thickness=100 mm×150 mm×3 mm) are manufactured by injection-molding to have a weld line on the surface using a mold having two gates. In contrast, an article specimen is painted with aluminum according to Comparative Example 6.

Experimental Examples

The article specimens are evaluated according to the following methods. The results are provided in the following Table 2.

TABLE 2

|  |  | Examples | | | | Comparative Examples | | | | | |
|---|---|---|---|---|---|---|---|---|---|---|---|
|  |  | 1 | 2 | 3 | 4 | 1 | 2 | 3 | 4 | 5 | 6 |
| Metal-like texture (Flop index) | | 12 | 13 | 15 | 11 | 12 | 6 | 11 | 7 | 12 | 15 |
| Metal particle texture (Sparkle intensity) | | 8 | 9 | 10 | 8 | 8 | 6 | 4 | 7 | 4 | 10 |
| Luminance (%) (Gloss level, 60°) | | 87 | 90 | 95 | 87 | 80 | 72 | 65 | 73 | 64 | 90 |
| Article Appearance | Flow mark | 4 | 4 | 4 | 4 | 3 | 3 | 1 | 4 | 1 | 4 |
|  | Weld line | 4 | 4 | 4 | 4 | 3 | 3 | 1 | 4 | 1 | 4 |

Figure 2:
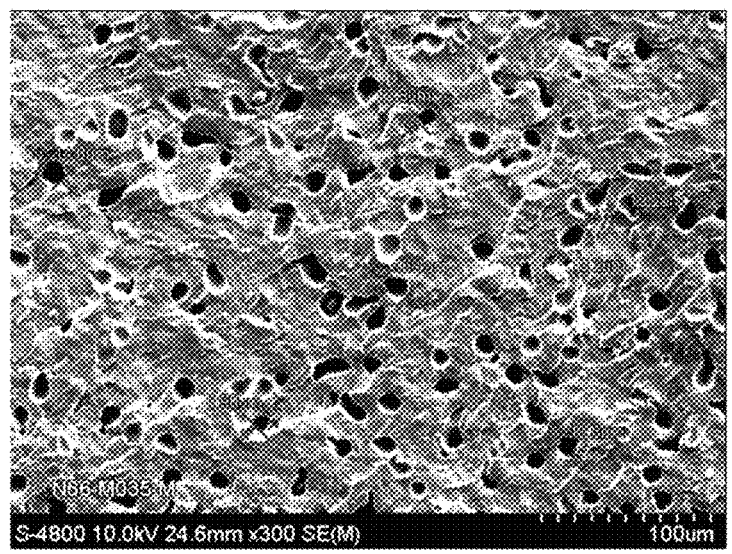
FIG. 2 is a SEM photograph showing the cross-section of an article according to one embodiment of the present invention.
Figure 3:
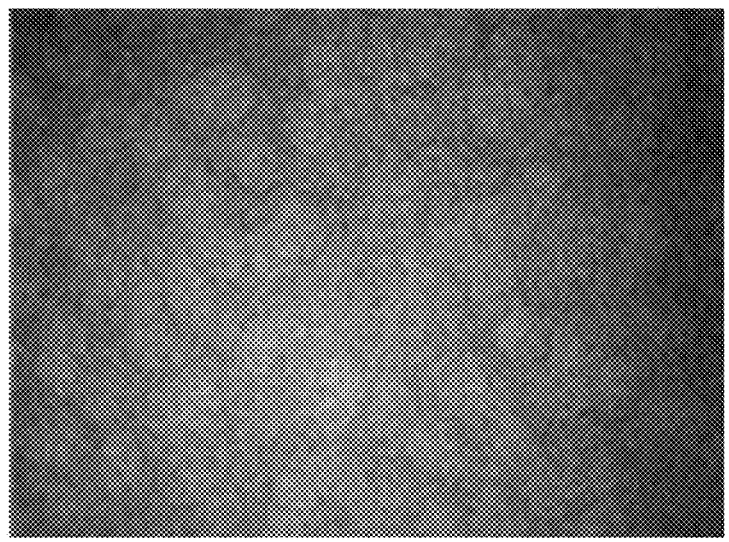
FIG. 3 is an X-ray photograph showing the cross-section of the article according to one embodiment of the present invention.

Experimental Example 1: Particle Diameter and Dispersion Degree of Pore in Article FIG. 2 is a SEM photograph showing the cross section of an article according to Example 3. FIG. 3 is an X-ray photograph showing the cross section of the article according to Example 3. In FIG. 3, a light part shows pores. Referring to FIGS. 2 and 3, the pores are uniformly formed in the article according to one embodiment of the present invention and have an average particle diameter of about 15 μm.

Experimental Example 2: Flop Index

The article according to the present invention is measured regarding the metal-like texture using a flop index. The flop index of the article is measured using a BYK-Mac spectrophotometer (BYK Inc.).

Referring to Table 2, an aluminum painted article according to Comparative Example 6 has a flop index of 15. The articles according to Examples 1 to 4 are not painted but have a flop index ranging from 11 to 15 and exhibit a metal-like texture near to that of a painted article. In particular, the article according to Example 3 has a flop index of 15 and exhibits an equivalent metal-like texture to that of a painted article.

In contrast, the articles according to Comparative Examples 2 and 4 have a remarkably low flop index.

Experimental Example 3: Sparkle Intensity

The metal particle texture is evaluated by using sparkle intensity as an index in the present invention. The sparkle intensity of the article according to the present invention is measured using a multi-angle spectrophotometer (MA98, X-Rite Inc.).

Referring to Table 2, the aluminum-painted article according to Comparative Example 6 has a sparkle intensity of 10. The articles according to Examples 1 to 4 are not painted but have a sparkle intensity ranging from 8 to 10 and exhibit a metal particle texture near to that of the painted article. In particular, the article of Example 3 has a sparkle intensity of 10 and exhibits an equivalent metal particle texture to that of the painted article.

In contrast, articles according to Comparative Examples 2 to 5 have lower sparkle intensities than those according to Examples 1 to 4.

Experimental Example 4: Luminance

The article according to the present invention is evaluated regarding luminance as a brightness index such as metal gloss and the like by measuring a gloss level at 60° with a UGV-6P digital variable glossmeter (SUGA Test Instruments Co., Ltd.).

Referring to Table 2, an aluminum-painted article according to Comparative Example 6 has a luminance of 90%. The articles according to Examples 1 to 4 are not painted but have a luminance ranging from 87 to 95% near to that of the painted article or more excellent luminance. In particular, the articles according to Examples 2 and 3 have a luminance of greater than or equal to 90% near to that of the painted article or more excellent luminance.

In contrast, the articles according to Comparative Examples 1 to 5 have remarkably lower luminance than those according to Examples 1 to 4.

Experimental Example 5: Article Appearance

The articles according to Example and Comparative Example are observed regarding appearance, that is, flow mark and weld line degrees due to injection-molding with the naked eye. The appearance of the articles is evaluated with a reference to the following Table 3.

TABLE 3

| Index of article appearance | Article appearance |
|---|---|
| 1 | A different color of greater than or equal to 70% to less than or equal to 100% in the flow mark or weld line As depicted in FIG. 9A |
| 2 | A different color of greater than or equal to 50% to less than or equal to 70% in the flow mark or weld line flow mark As depicted in FIG. 9B |
| 3 | A different color of greater than or equal to 10% to less than or equal to 50% in the flow mark or weld line flow mark As depicted in FIG. 9C |
| 4 | A different color of less than or equal to 10% in the flow mark or weld line flow mark As depicted in FIG. 9D |

Referring to Table 2, the articles according to Examples 1 to 4 have a very excellent article appearance of 4. In other words, the articles according to Examples 1 to 4 have almost no discoloring in the flow mark or weld line. The reason that the article according to the present invention has no different color in a flow mark or weld line and excellent appearance near to the aluminum-painted article according to Comparative Example 3 is caused by pores formed due to the aforementioned $N_2$ gas injection.

In contrast, the articles according to Comparative Examples 1 and 2 have a different color of greater than or equal to 10% and less than 50% in a flow mark and a weld line. Comparing the article of Example 2 with the one of Comparative Example 1, the article having a pore formed by injecting gas according to Example 2 has much more excellent appearance than the one including no gas injection according to Comparative Example 1.

The articles according to Comparative Examples 3 and 5 have plenty of different colors in a flow mark and a weld line.

Figure 5:
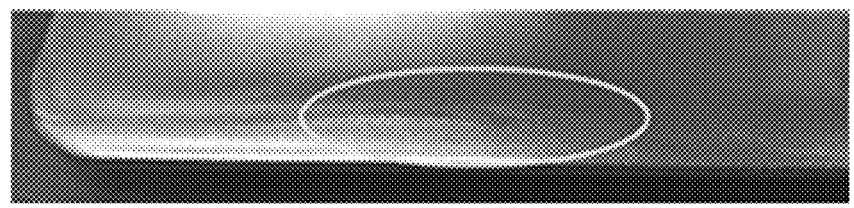
FIG. 5 is a photograph showing an article according to one comparative example.
Figure 6:
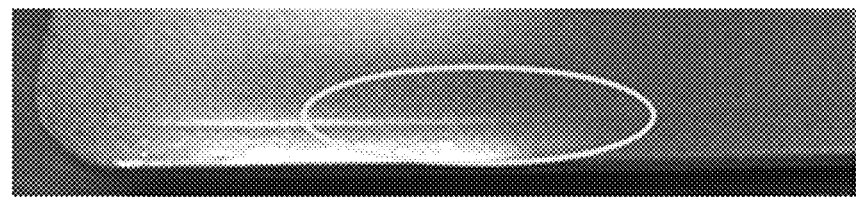
FIG. 6 is a photograph showing an article according to one embodiment of the present invention.

In order to compare generation of flow marks, FIG. 5 is a photograph showing the article according to Comparative Example 1, and FIG. 6 is a photograph of the article according to Example 2. FIG. 5 relatively clearly shows a flow mark, while FIG. 6 shows almost no flow mark.

Figure 7:
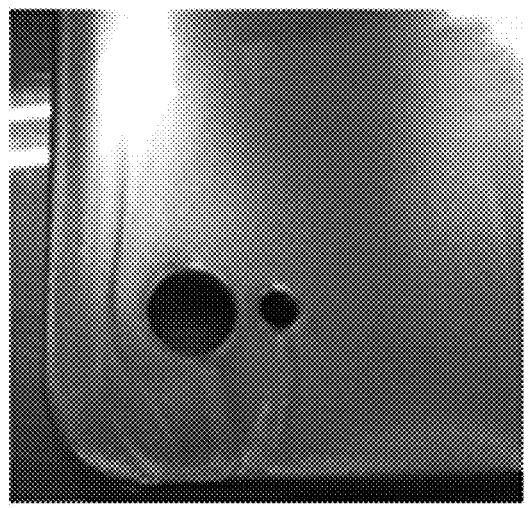
FIG. 7 is a photograph showing an article according to one comparative example.
Figure 8:
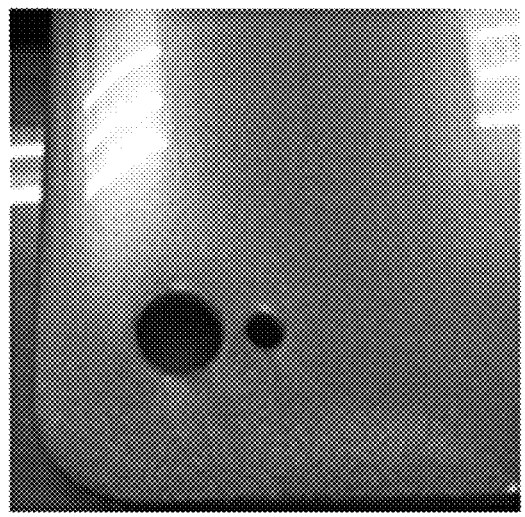
FIG. 8 is a photograph showing an article according to one embodiment of the present invention.

In order to compare generation of weld lines, FIG. 7 is a photograph showing the article according to Comparative Example 1, while FIG. 8 is a photograph showing the article according to Example 2. FIG. 7 relatively clearly shows a weld line, while FIG. 8 shows almost no weld line.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

DESCRIPTION OF SYMBOLS

101: first coating layer
102: second coating layer
103: metal deposition layer

What is claimed is:

1. An article having a surface comprising:
a thermoplastic resin, metal-resin composite particles, and pores,
wherein the metal-resin composite particles comprise a metal deposition layer, a first coating layer positioned on one side of the metal deposition layer, and a second coating layer positioned on the other side of the metal deposition layer, and
the first coating layer and second coating layer include a thermosetting resin respectively, wherein the thermosetting resin comprises a silicone resin and wherein at least one of the first coating layer and the second coating layer further includes polyvinyl butyral (PVB),
wherein the thermoplastic resin comprises a polyalkyl (meth)acrylate resin,
wherein the metal-resin composite particles have a flat surface, and wherein the flat surface of the metal-resin composite particles has an angle of about 0° to about 30° with reference to the surface of the article, and
wherein the metal-resin composite particles are included in an amount of about 0.1 to about 2.0 parts by weight based on about 100 parts by weight of the thermoplastic resin.

2. The article of claim 1, wherein the pores have an average particle diameter of about 10 μm to about 1000 μm.

3. The article of claim 1, wherein the metal deposition layer is an aluminum deposition layer.

4. The article of claim 1, wherein the thermosetting resin has a refractive index of about 1.45 to about 1.55.

5. The article of claim 1, wherein the first coating layer and second coating layer are independently transparent or translucent.

6. The article of claim 1, wherein the metal-resin composite particles further comprise at least one thermoplastic resin layer, wherein the thermoplastic resin layer is positioned on at least one of an external surface of the first coating layer and an external surface of the second coating layer.

7. The article of claim 1, wherein the metal-resin composite particles have a thickness of about 1.01 μm to about 100 μm.

8. The article of claim 1, wherein the metal-resin composite particles have an average particle diameter of about 2 μm to about 2000 μm.

9. The article of claim 1, wherein the metal-resin composite particles are uniformly dispersed in the article.

10. The article of claim 1, wherein the thermoplastic resin has a refractive index of about 1.45 to about 1.55.

11. The article of claim 1, wherein the thermoplastic resin is transparent or translucent.

12. The article of claim 1, wherein the article has a flop index of about 11 to about 25, a sparkle intensity of about 8 to about 20, and luminance of about 70 to about 100% measured based on a gloss level at an angle of about 60°.

13. The article of claim 1, wherein the metal-resin composite particles and the pores are distributed throughout the thermoplastic resin of the article.

14. The article of claim 1, wherein the metal-resin composite particles are included in an amount of about 0.2 to about 0.5 parts by weight based on about 100 parts by weight of the thermoplastic resin.

15. A method of manufacturing an article, comprising
adding a resin composition including a thermoplastic resin and metal-resin composite particles to an injection apparatus cylinder followed by melting/kneading to prepared a first mixture,
injecting a gas into the first mixture to prepare a second mixture, and
injection-molding the second mixture to manufacture an article,
wherein the metal-resin composite particles comprise a metal deposition layer, a first coating layer positioned on one side of the metal deposition layer, and a second coating layer positioned on the other side of the metal deposition layer,
the first coating layer and second coating layer comprises a thermosetting resin respectively, and
the article comprises pores,
the metal-resin composite particles have a flat surface, and wherein the flat surface of the metal-resin composite particles has an angle of about 0° to about 30° with reference to the surface of the article,
the first coating layer and second coating layer include a thermosetting resin respectively, wherein the thermosetting resin comprises a silicone resin and wherein at least one of the first coating layer and the second coating layer further includes polyvinyl butyral (PVB),
the thermoplastic resin comprises a polyalkyl(meth)acrylate resin, and
the metal-resin composite particles are included in an amount of about 0.1 to about 2.0 parts by weight based on about 100 parts by weight of the thermoplastic resin.

16. The method of claim 15, wherein the gas comprise nitrogen, carbon dioxide, butane, pentane, or a combination thereof.

17. The method of claim 15, wherein the second mixture is a supercritical fluid.

* * * * *